United States Patent
Hulick, Jr.

(10) Patent No.: US 12,174,941 B2
(45) Date of Patent: Dec. 24, 2024

(54) REFLECTION RUNTIME PROTECTION AND AUDITING SYSTEM

(71) Applicant: Cisco Technology, Inc., San Jose, CA (US)

(72) Inventor: Walter Theodore Hulick, Jr., Pearland, TX (US)

(73) Assignee: Cisco Technology, Inc., San Jose, CA (US)

(*) Notice: Subject to any disclaimer, the term of this patent is extended or adjusted under 35 U.S.C. 154(b) by 579 days.

(21) Appl. No.: 17/494,952

(22) Filed: Oct. 6, 2021

(65) Prior Publication Data

US 2023/0103992 A1     Apr. 6, 2023

(51) Int. Cl.
    *G06F 21/54*            (2013.01)
    *G06F 21/53*            (2013.01)

(52) U.S. Cl.
    CPC .............. *G06F 21/54* (2013.01); *G06F 21/53* (2013.01); *G06F 2221/033* (2013.01); *G06F 2221/2101* (2013.01)

(58) Field of Classification Search
    CPC .... G06F 21/54; G06F 21/53; G06F 2221/033; G06F 2221/2101; G06F 21/52; G06F 21/604
See application file for complete search history.

(56) References Cited

U.S. PATENT DOCUMENTS 6,505,211 B1    1/2003   Dessloch et al.
6,918,126 B1 *   7/2005   Blais ..................... G06F 9/4488
                                                  717/148

(Continued)

FOREIGN PATENT DOCUMENTS

CN     107194254 A   *   9/2017   .......... G06F 21/562
CN     108920179         11/2018
CN     109710384         2/2021

OTHER PUBLICATIONS

"Unsafe Use of Reflection", online: https://owasp.org/www-community/vulnerabilities/Unsafe_use_of_Reflection, Jun. 2016, 6 pages, OWASP Foundation, Inc.

(Continued)

*Primary Examiner* — Trong H Nguyen
(74) *Attorney, Agent, or Firm* — BEHMKE INNOVATION GROUP LLC; James M. Behmke; James J. Wong

(57) ABSTRACT

In one embodiment, a method may comprise: instrumenting, by a process, runtime of a software application; detecting, by the process, a reflection call made within the runtime of the software application; determining, by the process and from the reflection call, a reflection target and a reflection caller; comparing, by the process, the reflection target, the reflection caller, and the reflection call against a security policy; and performing, by the process, one or more mitigation actions on the reflection call in response to a violation of the security policy. In another embodiment, a secure audit process first generates the security policy based on approving reflection calls, reflection targets, and reflection callers seen during a runtime of the software application in a secure environment, and then shares the security policy with local instrumentors of the software application to cause enforcement of the security policy against a local runtime of the software application.

20 Claims, 9 Drawing Sheets

(56) References Cited

U.S. PATENT DOCUMENTS

| | | | |
|---|---|---|---|
| 9,830,448 B2 | 11/2017 | Holt | |
| 10,367,822 B2 | 7/2019 | Buckley et al. | |
| 2010/0333072 A1* | 12/2010 | Dulip | G06F 11/3419 707/769 |
| 2022/0075876 A1* | 3/2022 | Rioux | G06F 11/3466 |

OTHER PUBLICATIONS

"Unsafe Reflection", online: https://vulncat.fortify.com/en/detail?id=desc.dataflow.java.unsafe_reflection, accessed May 12, 2021, 5 pages, Micro Focus.

Nasi, Emeric, "Modify Any Java Class Field Using Reflection", online: https://blog.sevagas.com/Modify-any-Java-class-field-using-reflection, Jan. 2011, 9 pages, Sevagas.com.

"Evil Java Hacks with Reflection", online: https://riptutorial.com/java/example/17965/evil-java-hacks-with-reflection, accessed May 12, 2021, 4 pages, RIPTutorial.com.

"Reflection API: Reflection. The dark side of Java", online: https://codegym.cc/groups/posts/45-reflection-api-reflection-the-dark-side-of-java, Sep. 2018, 12 pages, CodeGym.

"Class Class<T>", online: https://docs.oracle.com/javase/8/docs/api/java/lang/Class.html, Java Platform Standard Ed. 8, accessed May 12, 2021, 39 pages, Oracle.

"Class Method", online: https://docs.oracle.com/javase/8/docs/api/java/lang/reflect/Method.html#invoke-java.lang.Object-java.lang.Object . . . -, Java Platform Standard Ed. 8, accessed May 12, 2021, 15 pages, Oracle.

"Class Field", online: https://docs.oracle.com/javase/7/docs/api/java/lang/reflect/Field.html#get(java.lang.Object), Java Platform Standard Ed. 7, accessed May 12, 2021, 17 pages, Oracle.

"Class Constructor<T>", online: https://docs.oracle.com/javase/7/docs/api/java/lang/reflect/Constructor.html#newinstance(java.lang.Object . . . ), Java Platform Standard Ed. 7, accessed May 12, 2021, 9 pages, Oracle.

* cited by examiner

```
java.lang.reflect.Method.invoke(Method.java),
org.apache.logging.log4j.util.StackLocator.getCallerClass(StackLocator.java:113)
org.apache.logging.log4j.util.StackLocator.getCallerClass(StackLocator.java:144)
org.apache.logging.log4j.util.StackLocatorUtil.getCallerClass(StackLocatorUtil.java:67)
org.apache.logging.log4j.jcl.LogAdapter.getContext(LogAdapter.java:39)
org.apache.logging.log4j.spi.AbstractLoggerAdapter.getLogger(AbstractLoggerAdapter.java:48)
org.apache.logging.log4j.jcl.LogFactoryImpl.getInstance(LogFactoryImpl.java:40)
org.apache.logging.log4j.jcl.LogFactoryImpl.getInstance(LogFactoryImpl.java:55)
org.apache.commons.logging.LogFactory.getLog(LogFactory.java:655)
org.apache.http.impl.conn.DefaultHttpResponseParser.(DefaultHttpResponseParser.java:59)
org.apache.http.impl.conn.DefaultHttpResponseParserFactory.create(DefaultHttpResponseParserFactory.java:76)
org.apache.http.impl.conn.DefaultBHttpClientConnection.(DefaultBHttpClientConnection.java:99)
org.apache.http.impl.conn.DefaultManagedHttpClientConnection.(DefaultManagedHttpClientConnection.java:74)
org.apache.http.impl.conn.LoggingManagedHttpClientConnection.(LoggingManagedHttpClientConnection.java:66)
org.apache.http.impl.conn.ManagedHttpClientConnectionFactory.create(ManagedHttpClientConnectionFactory.java:127)
org.apache.http.impl.conn.ManagedHttpClientConnectionFactory.create(ManagedHttpClientConnectionFactory.java:57)
. . .
```

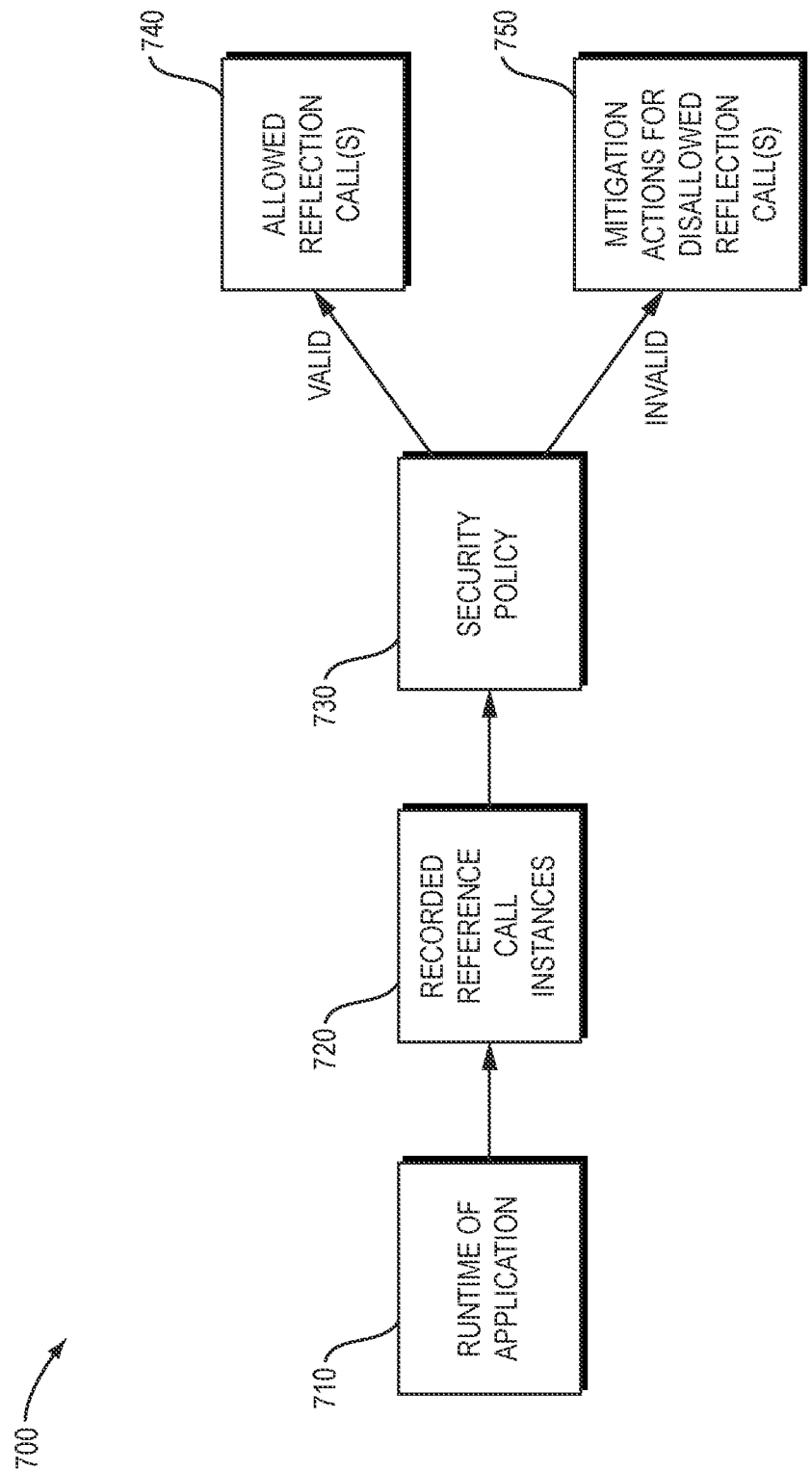

REFLECTION RUNTIME PROTECTION AND AUDITING SYSTEM

TECHNICAL FIELD

The present disclosure relates generally to computer systems, and, more particularly, to a reflection runtime protection and auditing system.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services, including security.

Java is a well-known example of a high-level, class-based, object-oriented programming language used for many web applications, where compiled code can run on all platforms, typically compiled to bytecode that can run on any Java virtual machine (JVM) regardless of the underlying computer architecture. Though Java is a widely used language for many applications, certain features of Java still pose various issues to application stakeholders. For instance, the Java Reflection System is heavily used by both the JVM and many third party pieces of code to make calls to any method for the purpose of modifying and/or accessing data. Java reflection, however, is a great security concern, as it is inherently insecure, potentially exposing control and data to unscrupulous parties.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example call stack;

FIG. 7 illustrates an example simplified procedure for reflection runtime protection;

DESCRIPTION OF EXAMPLE EMBODIMENTS

Overview

Figure 1:
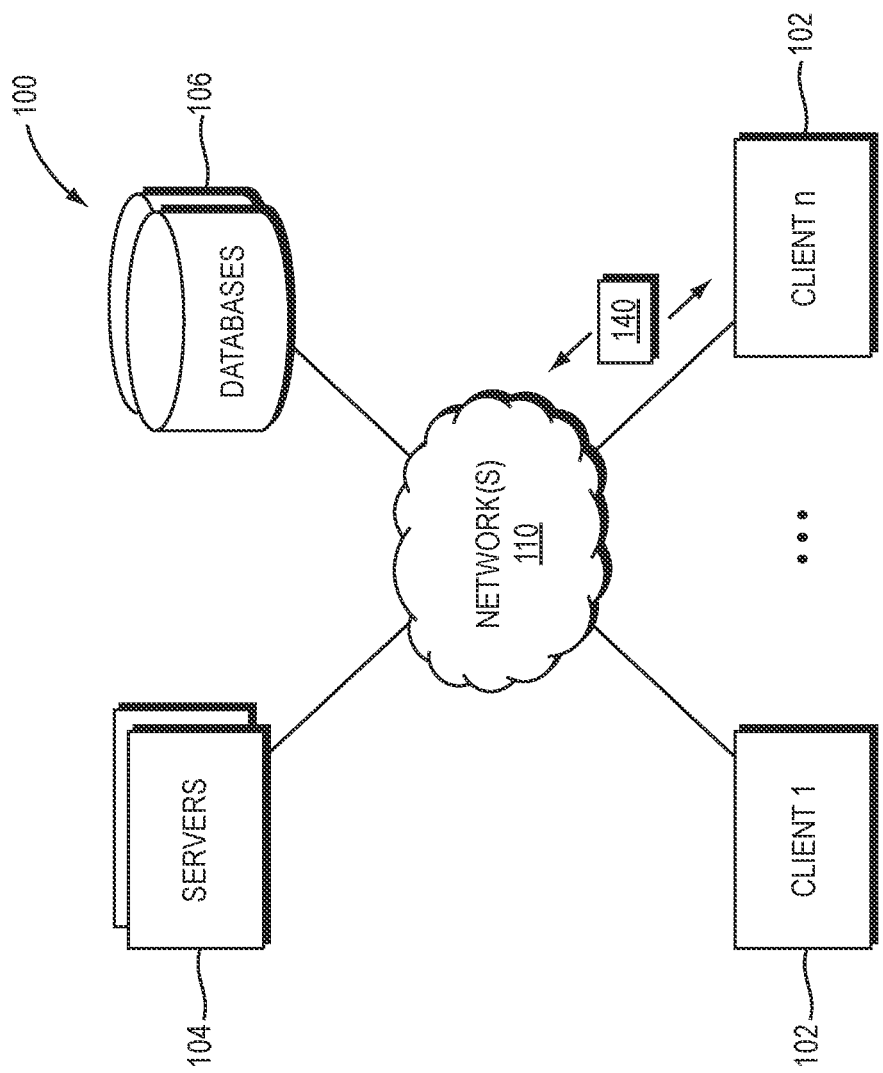
FIG. 1 illustrates an example computer network.

According to one or more embodiments of the disclosure, an illustrative method herein may comprise: instrumenting, by a process, runtime of a software application in a secure environment; detecting, by the process, reflection calls made within the runtime of the software application in the secure environment; determining, by the process and from the reflection calls, reflection targets and reflection callers of reflection calls respectively; generating, by the process, a security policy based on approving one or more of: the reflection calls, the reflection targets, and the reflection callers seen during the runtime of the software application in the secure environment; and sharing, by the process, the security policy with local instrumentors of the software application to cause the local instrumentors to enforce the security policy against a local runtime of the software application.

According to one or more additional embodiments of the disclosure, another illustrative method herein may comprise: instrumenting, by a process, runtime of a software application; detecting, by the process, a reflection call made within the runtime of the software application; determining, by the process and from the reflection call, a reflection target and a reflection caller; comparing, by the process, the reflection target, the reflection caller, and the reflection call against a security policy; and performing, by the process, one or more mitigation actions on the reflection call in response to a violation of the security policy.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to pre-defined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
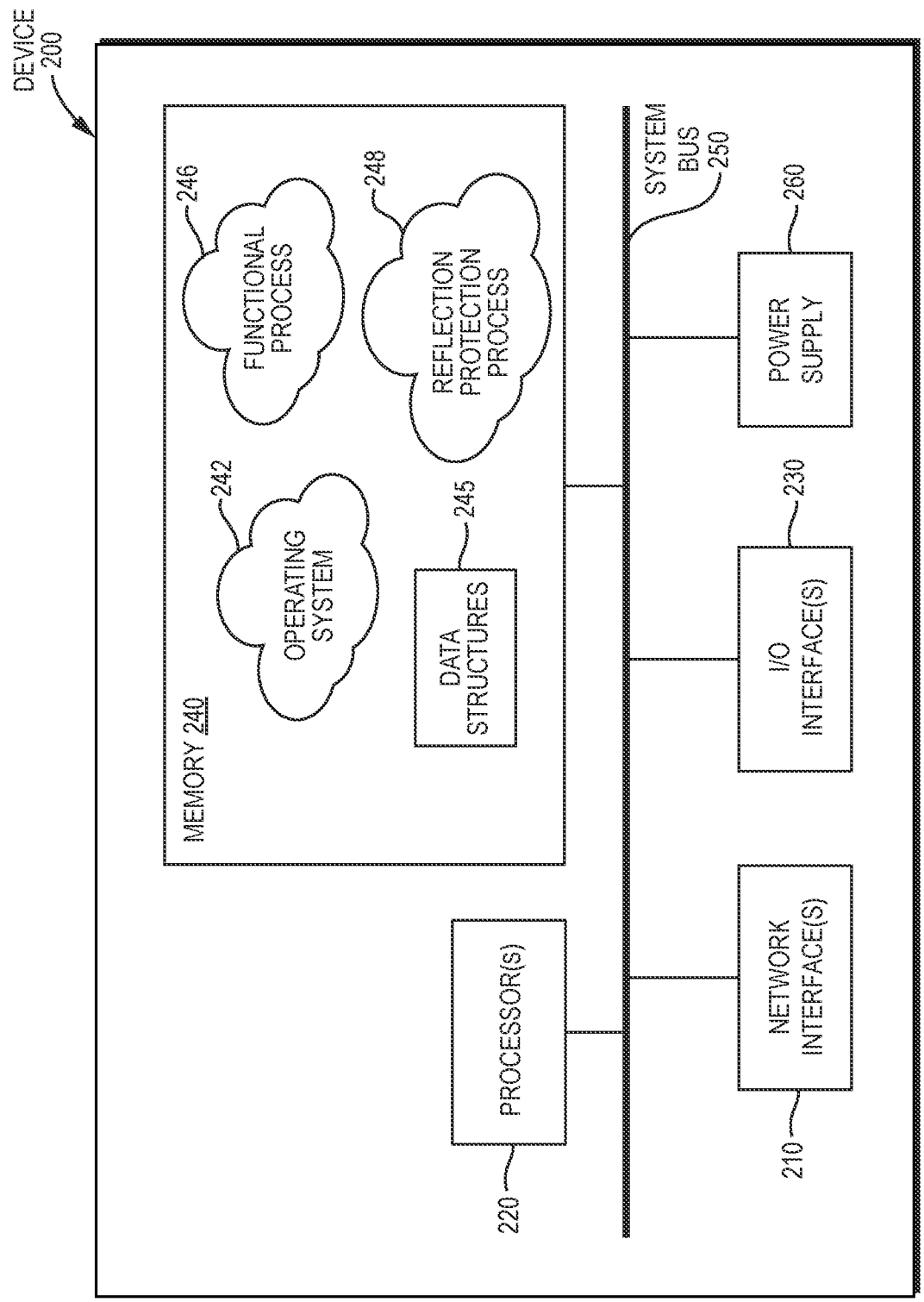
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "reflection protection" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
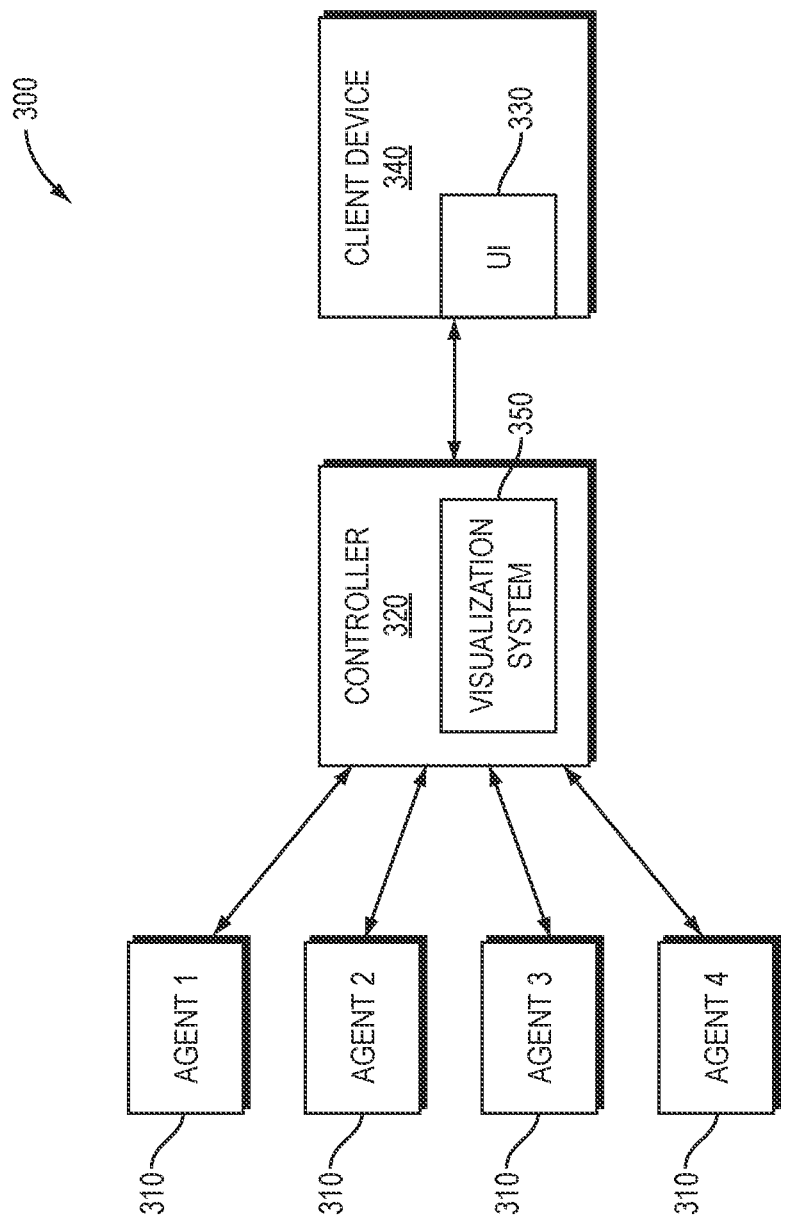
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——Reflection Runtime Protection and Auditing System——

As noted above, Java is a well-known example of a high-level, class-based, object-oriented programming language used for many web applications, where compiled code can run on all platforms, typically compiled to bytecode that can run on any Java virtual machine (JVM) regardless of the underlying computer architecture. As also noted above, certain features of Java still pose various issues to application stakeholders. For instance, the Java Reflection System is heavily used by both the JVM and many third party pieces of code to make calls to any method for the purpose of modifying and/or accessing data. Java reflection, however, is a great security concern, as it is inherently insecure, particularly due to the lack of granular controls on who can make calls and what can be executed or accessed, potentially exposing control and data to unscrupulous parties.

In particular, in the case of methods, constructors, or fields that are public (e.g., because they need to be accessed from outside packages), application stakeholders generally have no way to protect the code, especially when that code is third-party-based, with no access to source. Conversely, in the case of methods, constructors, or fields that are marked inaccessible to the caller (e.g., "non-public"), the Java language has a built-in "workaround" that removes the protection, making the method or field accessible by calling this method:

setAccessible(boolean flag);

which sets the "accessible flag" for this object to the indicated boolean value: a value of "true" indicates that the reflected object should suppress Java language access checking when it is used, while a value of "false" indicates that the reflected object should enforce Java language access checks. At this point, however, by marking an object's accessible flag to "true", the object might as well be marked public—because it's now completely accessible.

Historically, the only way to stop this issue was to use the Java Security Manager, which allows granting permission and allowing access to private methods and members, through the setting a permission class for reflective operations:

ReflectPermission "suppressAccessChecks";

which itself creates issues. In particular, this permission setting allows suppressing the standard Java language access checks—for public, default (package) access, protected, and private members—performed by reflected objects at their point of use. That is, this "all or nothing" ability to access fields and invoke methods in a class includes not only public, but protected and private fields and methods as well. This is known within the Java language to be dangerous in that information (possibly confidential) and methods normally unavailable would be accessible to malicious code. It may be possible, for instance, for anyone to access any field, which could social security numbers, credit card numbers, or credentials to a database, keystore, and/or even the admin account.

Moreover, though any control over reflection has been achieved by using permissions within the Java Security Manager, the Java Security Manager solution affects a lot more than just reflection, as you must grant permissions of all kinds to your application. Because of this, one must know all of the jar files that are allowed to access private methods and fields in not only your source, but the JVM, and third-party libraries, which is generally an insurmountable task.

Still further, class reflection itself can be used for "discovery", as it is very difficult to stop Java Reflection from disclosing the names and calling signatures of all of the class methods, constructors, and fields. Generally, the only way to stop this dilemma is to use the Java Security Manager to grant specific permissions and allow discovery of private methods and members, such as by setting the following permission:

ReflectPermission "checkMemberAccess".

However, often by simply looking at the names, "tips" can still be found for a would-be hacker or someone looking to steal information to what the method function might be or what might be contained in the field (e.g., it's not unusual to see method or field names that actually the use "password" in the name). It is thus very difficult to keep a class completely private still, even using this methodology.

The techniques herein, therefore, provide a reflection runtime protection and auditing system. In particular, the techniques described in greater detail below use interception technology to obtain the reflection call "calling context", such as: a call stack, a reflection caller (who wants to make this call), a reflection target (what method will be executed or what data field will be accessed), and a reflection call (what runtime reflection call will be made to do this). From this information, the techniques herein can audit reflection controls of a given application, and can compare them against a security policy to take appropriate action, accordingly.

As a primer, reflection essentially works based on a Class object, where a "rogue" element in the runtime could acquire the object by using code similar to this:

Class cl=Class.forName("Classname", true, Classloader);

where you would have to know what class name you wanted and get access to the ClassLoader it lives in. Once you have the class, you can now do the following:

1. This allows the execution of any Method in the Runtime:

```
Method m = cl.getDeclaredMethod("name",Class[ ]{ });
m.setAccessible(true)
Result = m.invoke(instance,Object[ ]{ })
```

2. This allows access to any data (fields) in the Runtime:

```
Field f = cl.getDeclaredField("name",Class[ ]{ });
f.setAccessible(true)
Result = f.get(instance) or f.set(instance)
```

3. This allows access to create any object for any class in the Runtime (for constructors):

```
Constructor c = cl.getDeclaredConstructor("name");
c.setAccessisble(true)
Object instance = f.newInstance( );
```

4. This allows discovery of methods, fields, etc. in any class in the Runtime (discovery calls):

```
Method m=cl.getDeclaredMethod("name",Class[ ])
Field f=cl.getDeclaredField("name")
Constructor c=cl.getDeclaredConstructor(Class[ ])
Method [m=cl.getMethod("name",Class[ ])
Field f=cl.getField("name")
Constructor c=cl.getConstructor(Class[ ])
Method[] m=cl.getDeclaredMethods("name",Class[ ])
Field[] f=cl.getDeclaredFields("name")
Constructor] c=cl.getDeclaredConstructors(Class[ ])
Method[] m=cl.getMethods("name",Class[ ])
Field[] f=cl.getFields("name")
Constructor] c=cl.getConstructors(Class[ ])
```

In sum, therefore, reflection allows any piece of code in the runtime to access any other code or data in the runtime, and there is no audit and there is no proper mechanism to ensure that only the necessary reflection calls are allowed to be made.

Operationally, therefore, the techniques herein solve these issues generally by:

Detecting and auditing all reflection calls, and breaking each down by:
What is the reflection target (the arguments)?
Who is making the call to the reflection target (the caller)?
What is the actual reflection call being made (the reflection call)?
Providing a mechanism to automatically record/build a security policy which would:
Specify authorized and/or unauthorized callers and/or call stacks;
Enforcing the security policy against "unauthorized" access (calls not authorized by the policy) and performing one or more mitigation actions, such as the following example actions:
Sending security events to notify security personnel;
Blocking the reflection call;
Etc.

Figure 4:
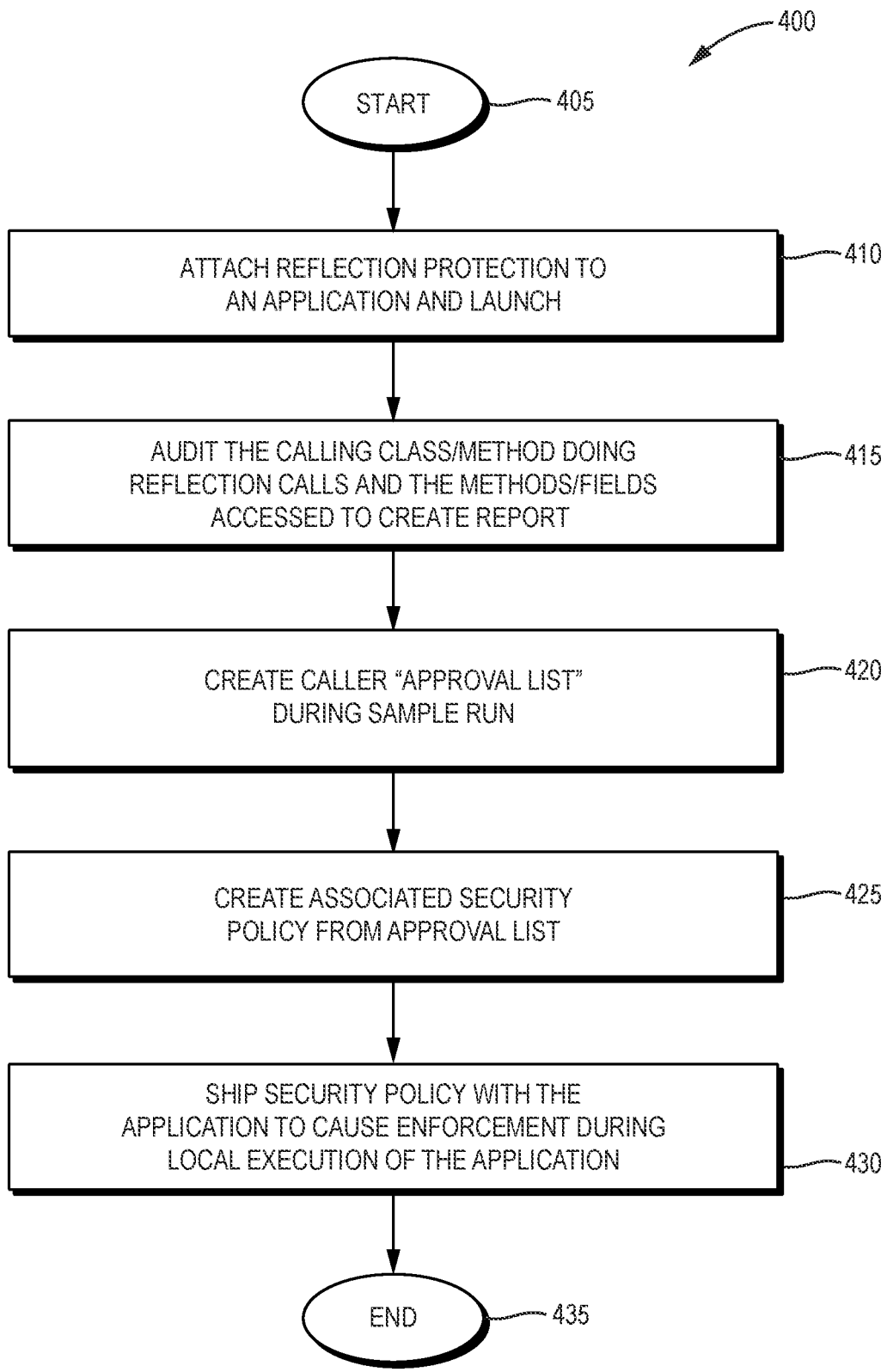
FIG. 4 illustrates an example simplified procedure for reflection auditing and runtime protection.

FIG. 4 illustrates an example flowchart 400 outlining the general concept that may be used to establish certain aspects of the techniques herein, without limitation. The illustrative steps, which are described in greater detail below, start in step 405, and proceed as follows:

Step 410: Attach code for the techniques herein (e.g., a reflection runtime protection and audit system, such as reflection protection process 248) to a particular application, and launch the application, such as through a load testing tool.

Step 415: Audit the calling class/method doing the reflection calls and the methods/fields accessed to create a report exposing who/what is calling/called.

Step 420: Create a caller "approval list" during a sample run of who/what is calling/called.

Step 425: Create a security policy of that caller "approval list".

Step 430: Ship the security policy with the application and enforce the "approval list" by blocking any reflection to methods, constructors, fields, and/or class discovery that do not have an "approved" caller.

In step 435 the end result of the above concept thus provides a list of all expected/authorized reflection calls (e.g., caller and target), which can be reviewed, manually approved, or modified to enforce and block unapproved reflection calls. Note that this eliminates the need to use the Java Security Manager, as well as the need to figure out what jars to grant for Reflection Permissions ("suppressAccessChecks"), as described above.

The below discussion will now address illustrative details of implementing the techniques herein. Note that while the techniques below are described with reference to "Bytecode Interception" (BCI), other interceptions may be used, particularly with languages other than Java (or .NET, etc.).

According to one or more embodiments of the techniques herein, code may be injected into the JVM to intercept the following known example reflection calls into specific JVM classes (the arguments determine the reflection target):

Method Call to Execute and Receive Result:

```
public Object invoke(Object obj,
               Object... args)
/*(Invokes the underlying method represented
by this Method object, on the
specified object with the specified parameters.
Returns the result of
dispatching the method represented by this
object on obj with parameters
args.)*/
```

Field Call to Extract a Field Value:

```
public Object get(Object obj)
/* (Returns the value of the field represented
by this Field, on the specified
object.)*/
```

Field Call to Set a Field Value:

```
public void set( Object obj,
                Object value)
/*(Sets the field represented by this Field
object on the specified object
argument to the specified new value.)*/
```

Constructor Call to Create a Class Instance:

```
public T newInstance(Object... initargs)
/*(Uses the constructor represented by this
Constructor object to create and
initialize a new instance of the constructor's
declaring class, with the
specified initialization parameters.)*/
```

Discovery Calls:

```
public Constructor<T> getConstructor(Class<?>... parameterTypes)
/*(Returns a Constructor object that reflects the specified public constructor
of the class represented by this Class object.)*/
public Constructor<?>[ ] getConstructors( )
/*(Returns an array containing Constructor objects reflecting all the public
constructors of the class represented by this Class object.)*/
public Constructor<T> getDeclaredConstructor(Class<?>... parameter-
Types)
/*(Returns a Constructor object that reflects the specified constructor of
the
class or interface represented by this Class object.)*/
public Constructor<?>[ ] getDeclaredConstructors()
/*(Returns an array of Constructor objects reflecting all the constructors
declared by the class represented by this Class object.)*/
public Field[ ] getDeclaredFields( )
/*(Returns an array of Field objects reflecting all the fields declared by the
class or interface represented by this Class object.)*/
public Field getDeclaredField(String name)
/*(Returns a Field object that reflects the specified declared field of the
class
or interface represented by this Class object.)*/
public Method getDeclaredMethod(String name,
                                 Class<?>... parameterTypes)
/*(Returns a Method object that reflects the specified declared method of
the
class or interface represented by this Class object.)*/
public Method[] getDeclaredMethods( )
/*(Returns an array containing Method objects reflecting all the declared
methods of the class or interface represented by this Class object.)*/
public Field[ ] getFields( )
/*(Returns an array containing Field objects reflecting all the accessible
public fields of the class or interface represented by this Class object.)*/
public Method[] getMethods( )
/*(Returns an array containing Method objects reflecting all the public
methods of the class or interface represented by this Class object.)*/
```

When the reflection calls take place, the techniques herein (e.g., during an audit or during local code execution) are intercepted by handlers, and then grouped into buckets determined by the "Reflection Target" from information taken from the Call Stack and arguments.

Figure 5:
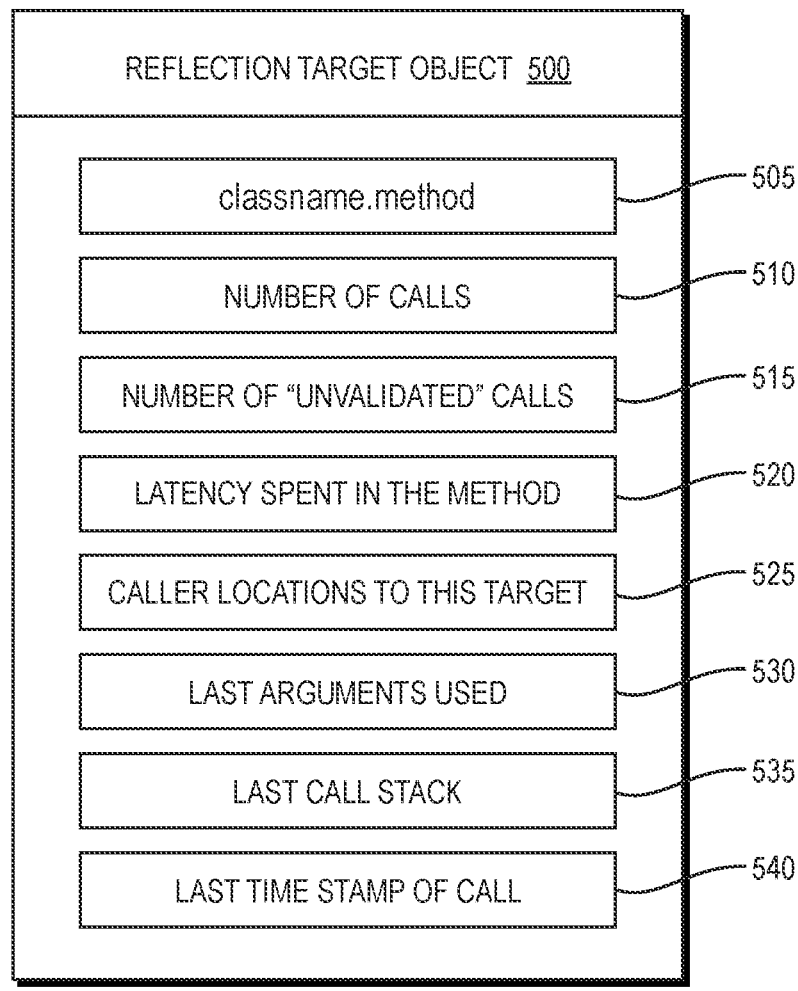
FIG. 5 illustrates an example reflection target object.

FIG. 5 illustrates a simplified example of a reflection target object 500 (e.g., an example and non-limiting data structure), which has the following self-explanatory fields:

505—classname.method;
510—number of calls;
515—number of "unvalidated" calls;
520—latency spent in the method;
525—Caller locations to this target (e.g., all caller locations);
530—last arguments used;
535—last call stack; and
540—last time stamp of call.

To obtain the reflection targets (and thus to populate the reflection target object 500 above), an example of intercepting a piece of code may be shown as follows:

```
sun.reflect.Reflection.getCallerClass
    /*(This is the Method we are trying to invoke.)*/
With these arguments:
    Arg: Null
        /*(Instance, this is a static call)*/
    Arg: [Ljava.lang.Object
        /* (Arguments)*/
```

In response to instrumenting and intercepting the execution of the example code above, an example resultant Call Stack 600 is shown in FIG. 6 (abbreviated). For example, in full form, what may be obtained from the example call stack may be as follows:

```
java.lang.reflect.Method.invoke(Method.java).
    /*This is the actual Reflection Call 610*/
org.apache.logging.log4j.util.StackLocator.getCallerClass(StackLocator.java:113)
    /*This is the Reflection Call Caller 620*/
org.apache.logging.log4j.util.StackLocator.getCallerClass(StackLocator.java:144)
org.apache.logging.log4j.util.StackLocatorUtil.getCallerClass(StackLocatorUtil.java:
    67)
org.apache.logging.log4j.jcl.LogAdapter.getContext(LogAdapter.java:39)
org.apache.logging.log4j.spi.AbstractLoggerAdapter.getLogger(AbstractLoggerAdap
    ter.java:48)
org.apache.logging.log4j.jcl.LogFactoryImpl.getInstance(LogFactoryImpl.java:40)
org.apache.logging.log4j.jcl.LogFactoryImpl.getInstance(LogFactoryImpl.java:55)
org.apache.commons.logging.LogFactory.getLog(LogFactory.java:655)
    org.apache.http.impl.conn.DefaultHttpResponseParser./DefaultHttpResponsePars
      er.java:59)
    org.apache.http.impl.conn.DefaultHttpResponseParserFactory.create/DefaultHttpRes
      ponseParserFactory.java:76)
    org.apache.http.impl.DefaultBHttpClientConnection./DefaultBHttpClientConnection.
      java:99)
    org.apache.http.impl.conn.DefaultManagedHttpClientConnection.(DefaultManagedH
      ttpClientConnection.java:74)
```

```
org.apache.http.impl.conn.LoggingManagedHttpClientConnection.tLoggingManaged
    HttpClientConnection.java:66)
org.apache.http.impl.conn.ManagedHttpClientConnectionFactory.create(ManagedHtt
    pClientConnectionFactory.java:127)
org.apache.http.impl.conn.ManagedHttpClientConnectionFactory.create(ManagedHtt
    pClientConnectionFactory.java:57)
org.apache.http.impl.conn.PoolingHttpClientConnectionManager$InternalConnection
    Factory.create(PoolingHttpClientConnectionManager.java:639)
org.apache.http.impl.conn.PoolingHttpClientConnectionManager$InternalConnection
    Factory.create(PoolingHttpClientConnectionManager.java:610)
org.apache.http.pool.AbstractConnPool.getPoolEntryBlocking(AbstractConnPool.jav
    a:379)
org.apache.http.pool.AbstractConnPool.access$300(AbstractConnPool.java:70)
org.apache.http.pool.AbstractConnPool$2.get(AbstractConnPool.java:253)
org.apache.http.pool.AbstractConnPool$2.get(AbstractConnPool.java:198)
org.apache.http.impl.conn.PoolingHttpClientConnectionManager.leaseConnection(Po
    olingHttpClientConnectionManager.java:306)
org.apache.http.impl.conn.PoolingHttpClientConnectionManager$1.get(PoolingHttp
    ClientConnectionManager.java:282)
org.apache.http.impl.execchain.MainClientExec.execute(MainClientExec.java:190)
org.apache.http.impl.execchain.ProtocolExec.execute(ProtocolExec.java:186)
org.apache.http.impl.execchain.RetryExec.execute(RetryExec.java:89)
org.apache.http.impl.execchain.RedirectExec.execute(RedirectExec.java:110)
org.apache.http.impl.client.InternalHttpClient.doExecute(InternalHttpClient.java:185)
org.apache.http.impl.client.CloseableHttpClient.execute(CloseableHttpClient.java:72)
com.singularity.ee.util.httpclient.SimpleHttpClientWrapper.executeHttpOperation(Si
    mpleHttpClientWrapper.java:302)
com.singularity.ee.util.httpclient.SimpleHttpClientWrapper.executeHttpOperation(Si
    mpleHttpClientWrapper.java:217)
com.singularity.ee.rest.RESTRequest.sendRequestTracked(RESTRequest.java:384)
com.singularity.ee.rest.RESTRequest.sendRequest(RESTRequest.java:337)
com.singularity.ee.rest.controller.request.AControllerRequest.sendRequest(Aontroller
    Request.java:130)
com.singularity.ee.rest.controller.request.ABinaryControllerRequest.sendRequest(AB
    inaryControllerRequest.java:36)
com.singularity.ee.agent.appagent.kernel.config.xml.ConfigurationChannel.registerA
    pplicationServer(ConfigurationChannel.java:1422)
com.singularity.ee.agent.appagent.kernel.config.xml.ConfigurationChannel.access$1
    00(ConfigurationChannel.java:120)
com.singularity.ee.agent.appagent.kernel.config.xml.ConfigurationChannel$Unregist
    eredConfigurationState.nextTransition(ConfigurationChannel.java:773)
com.singularity.ee.agent.appagent.kernel.config.xml.ConfigurationChannel.refreshCo
    nfiguration(ConfigurationChannel.java:543)
com.singularity.ee.agent.appagent.kernel.config.xml.XMLConfigManager$AgentCon
    figurationRefreshTask.run(XMLConfigManager.java:643)
com.singularity.ee.util.javaspecific.scheduler.AgentScheduledExecutorServiceImpl$S
    afeRunnable.run(AgentScheduledExecutorServiceImpl.java:122)
java.util.concurrent.Executors$RunnableAdapter.call(Executors.java:511)
com.singularity.ee.util.javaspecific.scheduler.ADFutureTask$Sync.innerRunAndRese
    t(ADFutureTask.java:335)
com.singularity.ee.util.javaspecific.scheduler.ADFutureTask.runAndReset(ADFuture
    Task.java:152)
com.singularity.ee.util.javaspecific.scheduler.ADScheduledThreadPoolExecutor$AD
    ScheduledFutureTask.access$101(ADScheduledThreadPoolExecutor.java:119)
com.singularity.ee.util.javaspecific.scheduler.ADScheduledThreadPoolExecutor$AD
    ScheduledFutureTask.runPeriodic(ADScheduledThreadPoolExecutor.java:206)
com.singularity.ee.util.javaspecific.scheduler.ADScheduledThreadPoolExecutor$AD
    ScheduledFutureTask.run(ADScheduledThreadPoolExecutor.java:236)
com.singularity.ee.util.javaspecific.scheduler.ADThreadPoolExecutor$Worker.runTa
    sk(ADThreadPoolExecutor.java:694)
com.singularity.ee.util.javaspecific.scheduler.ADThreadPoolExecutor$Worker.run(A
    DThreadPoolExecutor.java:726)
java.lang.Thread.run(UnknownSource)
```

According to the techniques herein, the call instances are recorded and first used (e.g., from an original version of the application) to create a security policy of approved/validated callers and methods (e.g., validated callers, validated callers for particular methods, validated methods, and any combination of validated reflection call features. From there, during runtime execution of an application 710 as shown in simplified process flow 700 of FIG. 7, the call instances 720 are recorded and now may be "checked" against the security policy 730 to see if the call has been validated (e.g., the call at all, the caller, and/or the particular method, etc.) (step 740 for "valid" calls) and allowed to proceed. However, if the call (e.g., call, caller, and/or method, etc.) is not validated, then either one of the following mitigation actions (step 750 for "invalid" calls) may take place:

The call is blocked (e.g., Security Exception is thrown);
The call is allowed, but the call (e.g., the Caller) is flagged as having been "invalid"; or
Other mitigation actions as appropriate (e.g., redirecting the call, generating a list or GUI based on unvalidated calls, etc.).

Figure 8:
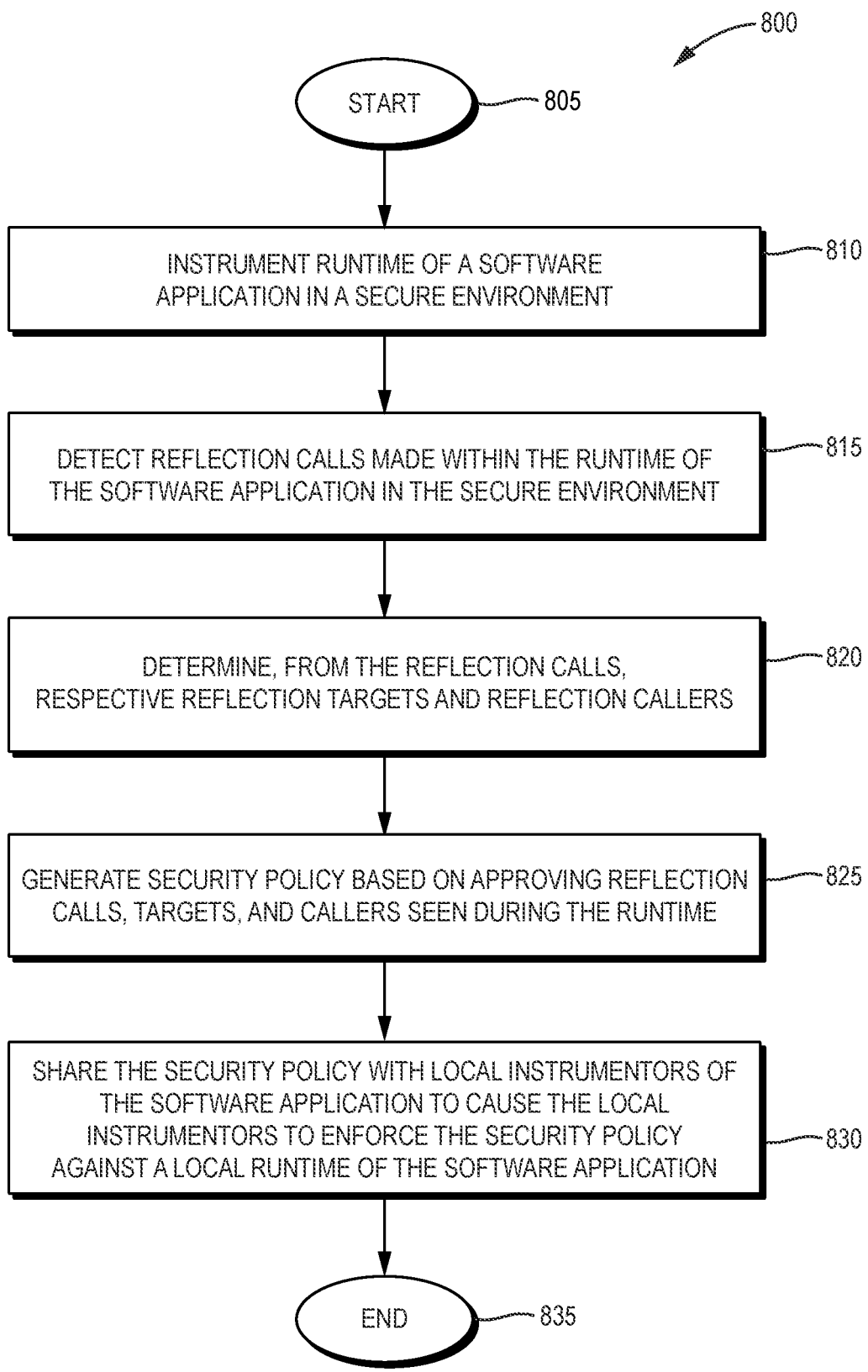
FIG. 8 illustrates another example simplified procedure for a reflection runtime protection and auditing system, particularly from the perspective of initial auditing.

In closing, FIG. 8 illustrates another example simplified procedure 800 for a reflection runtime protection and auditing system, particularly from the perspective of initial auditing. For example, a non-generic, specifically configured device (e.g., device 200, particularly an auditing device or server) may perform procedure 800 by executing stored instructions (e.g., process 248). The procedure 800 may start at step 805, and continues to step 810, where, as described in greater detail above, a process instruments runtime of a software application in a secure environment (e.g., illustratively based on byte code instrumentation, and where the software application is illustratively a Java application). As mentioned above, the secure environment may be an original version of the software application (e.g., pre-release) or other version that is deemed safe and secure, and run in a safe and secure environment (e.g., no outside/malicious interaction).

In step 815, the process detects reflection calls made within the runtime of the software application in the secure environment, and determines, in step 820, from the reflection calls, reflection targets and reflection callers of reflection calls respectively. For instance, as mentioned above, the reflection targets may comprise a particular method for execution, a particular data field for access, a particular constructor, a particular class discovery, and so on.

In step 825, the process generates a security policy based on approving the reflection calls, the reflection targets, and/or the reflection callers (e.g., alone and/or in combination) seen during the runtime of the software application in the secure environment.

As such, in step 830, the process may then share the security policy with local "instrumentors" of the software application to cause the local instrumentors to enforce the security policy against a local runtime of the software application. For instance, sharing may comprise pushing the security policy within the software application, pushing the security policy to local instrumentors locally instrumenting the software application, or other methods of sharing the policy with local enforcers. As described above (and as detailed below in procedure 900 of FIG. 9), the local instrumentors may then be caused to enforce the security policy for a local reflection call made during the local runtime of the software application by comparing a local reflection target, a local reflection caller, and a local reflection call against the security policy, and by performing one or more mitigation actions on the local reflection call in response to a violation of the security policy.

The simplified procedure 800 may then end in step 835. Other steps may also be included generally within procedure 800. For example, such steps (or, more generally, such additions to steps already specifically illustrated above), may include: pushing the security policy within the software application; pushing the security policy to local instrumentors locally instrumenting the software application; and so on.

Figure 9:
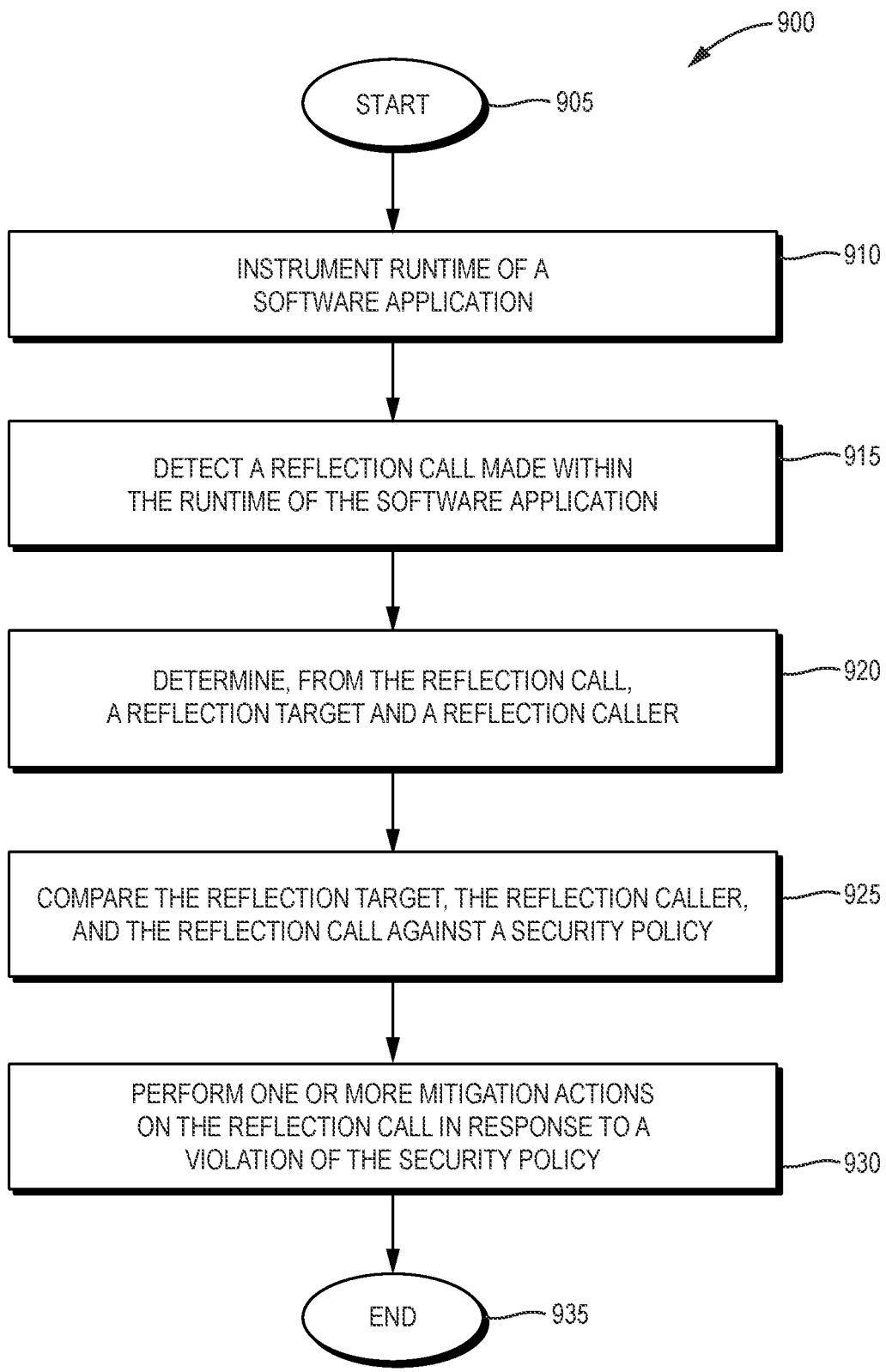
FIG. 9 illustrates still another example simplified procedure for a reflection runtime protection and auditing system, particularly from the perspective of runtime protection.

In addition, FIG. 9 illustrates still another example simplified procedure 900 for a reflection runtime protection and auditing system, particularly from the perspective of runtime protection. For example, a non-generic, specifically configured device (e.g., device 200, particularly an executing device or endpoint agent, i.e., an "instrumentor" above) may perform procedure 900 by executing stored instructions (e.g., process 248). The procedure 900 may start at step 905, and continues to step 910, where, as described in greater detail above, a process (e.g., Java agent) instruments runtime of a software application (e.g., again illustratively based on byte code instrumentation, and again where the software application is illustratively a Java application). In step 915, the process may then detect a reflection call made within the runtime of the software application, and in step 920 determines, from the reflection call, a reflection target and a reflection caller, as detailed above.

In step 925, the process then compares the reflection target, the reflection caller, and the reflection call against a security policy as described above. For instance, the process may determine whether the caller is validated for the reflection call, such as based on either the caller itself or a combination of the caller and the reflection target. (Note that the security policy may comprise one or both of an approved list and a disapproved list.) As detailed above, in one embodiment, the security policy is built based on a secure audit of the software application to determine reflection calls, reflection targets, and callers, and the security policy is based on approving one or more of: reflection calls, reflection targets, and reflection callers seen during the secure audit (e.g., as determined in procedure 800 of FIG. 8 above). As also mentioned above, the security policy may be built based on one or more manual entries, such as including one or more edits, revisions, additions, and/or subtractions from the generated policy or otherwise (e.g., including strictly manual, such as for disapproval lists).

In step 930, the process may then perform one or more mitigation actions on the reflection call in response to a violation of the security policy. As detailed above, such actions may comprise such things as blocking the reflection call, allowing the reflection call with a flagged violation indicator (or some other indication), generating a list, generating a notification, and/or generating a graphical user interface (GUI) presentation based on the violation(s), and so on.

The simplified procedure 900 may then end in step 935, notably with the ability to continue processing reflection calls as they are made and performing corresponding actions, accordingly. Other steps may also be included generally within procedure 900. For example, such steps (or, more generally, such additions to steps already specifically illustrated above), may include: blocking the reflection call; allowing the reflection call with a flagged violation indicator; allowing the reflection call in response to no violation of the security policy; and so on.

It should be noted that while certain steps within procedures/flows 400 and 700-900 may be optional as described above, the steps shown in FIGS. 4 and 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400 and 700-900 are described separately, certain steps from each procedure may be incorporated into each other procedure, and the procedures are not meant to be mutually exclusive.

The techniques described herein, therefore, provide for a reflection runtime protection and auditing system. In particular, the techniques herein provide a practical and lightweight solution to a security concern that has existed in the Java (and other runtimes like .NET) for almost thirty years. That is, as mentioned above, reflection is open to anyone who knows the class name/method/field, and access modifiers can be overwritten. Using the techniques herein, however, reflection calls can be intercepted, and based on who the caller is (and what they are calling, i.e., the call context), unapproved reflection calls may be blocked or otherwise handled accordingly. In addition to protecting the application itself, the techniques herein also expose and control blind spots in third party libraries, which may be unknown.

Notably, the techniques herein may be accomplished without enabling the Java Security Manager, without having to figure out which jars would need reflection permission, and without being restricted to "access by jar" (i.e., instead creating an "access by callers" policy herein). The techniques herein, therefore, provide an overall better solution for "security conscious" customers that is granular, automatic, and more straightforward than conventional all-or-nothing or manually intensive techniques.

Illustratively, the techniques described herein may be performed by hardware, software, and/or firmware, such as in accordance with the illustrative reflection protection process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: instrumenting, by a process, runtime of a software application; detecting, by the process, a reflection call made within the runtime of the software application; determining, by the process and from the reflection call, a reflection target and a reflection caller; comparing, by the process, the reflection target, the reflection caller, and the reflection call against a security policy; and performing, by the process, one or more mitigation actions on the reflection call in response to a violation of the security policy.

In one embodiment, the one or more mitigation actions comprises blocking the reflection call.

In one embodiment, the one or more mitigation actions comprises allowing the reflection call with a flagged violation indicator.

In one embodiment, comparing comprises: determining whether the reflection caller is validated for the reflection call. In one embodiment, determining whether the reflection caller is validated for the reflection call is based on either the reflection caller itself or a combination of the reflection caller and the reflection target.

In one embodiment, the security policy is built based on a secure audit of the software application to determine reflection calls, reflection targets, and callers, and wherein the security policy is based on approving one or more of: reflection calls, reflection targets, and reflection callers seen during the secure audit.

In one embodiment, the security policy is built based on one or more manual entries.

In one embodiment, the method further comprises: allowing the reflection call in response to no violation of the security policy.

In one embodiment, the reflection target comprises one or more of: a particular method for execution; a particular data field for access; a particular constructor; and a particular class discovery.

In one embodiment, the security policy comprises one or both of an approved list and a disapproved list.

In one embodiment, instrumenting is based on byte code instrumentation.

In one embodiment, the software application is a Java application.

According to the embodiments herein, an illustrative tangible, non-transitory, computer-readable medium herein may have computer-executable instructions stored thereon that, when executed by a processor on a computer, may cause the computer to perform a method comprising: instrumenting runtime of a software application; detecting a reflection call made within the runtime of the software application; determining, from the reflection call, a reflection target and a reflection caller; comparing the reflection target, the reflection caller, and the reflection call against a security policy; performing one or more mitigation actions on the reflection call in response to a violation of the security policy.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: instrument runtime of a software application; detect a reflection call made within the runtime of the software application; determine, from the reflection call, a reflection target and a reflection caller; compare the reflection target, the reflection caller, and the reflection call against a security policy; and perform one or more mitigation actions on the reflection call in response to a violation of the security policy.

According to the embodiments herein, an additional illustrative method herein may comprise: instrumenting, by a process, runtime of a software application in a secure environment; detecting, by the process, reflection calls made within the runtime of the software application in the secure environment; determining, by the process and from the reflection calls, reflection targets and reflection callers of reflection calls respectively; generating, by the process, a security policy based on approving one or more of: the reflection calls, the reflection targets, and the reflection callers seen during the runtime of the software application in the secure environment; and sharing, by the process, the security policy with local instrumentors of the software application to cause the local instrumentors to enforce the security policy against a local runtime of the software application.

In one embodiment for this method, the local instrumentors are caused to enforce the security policy for a local reflection call made during the local runtime of the software application by comparing a local reflection target, a local reflection caller, and a local reflection call against the security policy, and by performing one or more mitigation actions on the local reflection call in response to a violation of the security policy.

In one embodiment for this method, the reflection targets comprise one or more of: a particular method for execution; a particular data field for access; a particular constructor; and a particular class discovery.

In one embodiment for this method, instrumenting is based on byte code instrumentation.

In one embodiment for this method, the software application is a Java application.

In one embodiment for this method, sharing the security policy with local instrumentors of the software application comprises: pushing the security policy within the software application.

In one embodiment for this method, sharing the security policy with local instrumentors of the software application comprises: pushing the security policy to local instrumentors locally instrumenting the software application.

According to the embodiments herein, an additional illustrative tangible, non-transitory, computer-readable medium herein may have computer-executable instructions stored thereon that, when executed by a processor on a computer, may cause the computer to perform a method comprising: instrumenting runtime of a software application in a secure environment; detecting reflection calls made within the runtime of the software application in the secure environment; determining, from the reflection calls, reflection targets and reflection callers of reflection calls respectively; generating a security policy based on approving one or more of: the reflection calls, the reflection targets, and the reflection callers seen during the runtime of the software application in the secure environment; and sharing the security policy with local instrumentors of the software application to cause the local instrumentors to enforce the security policy against a local runtime of the software application.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: instrument runtime of a software application in a secure environment; detect reflection calls made within the runtime of the software application in the secure environment; determine, from the reflection calls, reflection targets and reflection callers of reflection calls respectively; generate a security policy based on approving one or more of: the reflection calls, the reflection targets, and the reflection callers seen during the runtime of the software application in the secure environment; and share the security policy with local instrumentors of the software application to cause the local instrumentors to enforce the security policy against a local runtime of the software application.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    instrumenting, by a process, runtime of a software application;
    detecting, by the process, a reflection call made within the runtime of the software application;
    determining, by the process and from the reflection call, a reflection target and a reflection caller;
    comparing, by the process, the reflection target, the reflection caller, and the reflection call against a security policy; and
    performing, by the process, one or more mitigation actions on the reflection call in response to a violation of the security policy, wherein the security policy is built based on a secure audit of the software application to determine reflection calls, reflection targets, and reflection callers.

2. The method as in claim 1, wherein the one or more mitigation actions comprises blocking the reflection call.

3. The method as in claim 1, wherein the one or more mitigation actions comprises allowing the reflection call with a flagged violation indicator.

4. The method as in claim 1, wherein comparing comprises:
determining whether the reflection caller is validated for the reflection call.

5. The method as in claim 4, wherein determining whether the reflection caller is validated for the reflection call is based on either the reflection caller itself or a combination of the reflection caller and the reflection target.

6. The method as in claim 1, wherein the security policy is based on approving one or more of: the reflection calls, the reflection targets, and the reflection callers seen during the secure audit.

7. The method as in claim 1, wherein the security policy is built based on one or more manual entries.

8. The method as in claim 1, further comprising:
allowing the reflection call in response to no violation of the security policy.

9. The method as in claim 1, wherein the reflection target comprises one or more of: a particular method for execution; a particular data field for access; a particular constructor; and a particular class discovery.

10. The method as in claim 1, wherein the security policy comprises one or both of an approved list and a disapproved list.

11. The method as in claim 1, wherein instrumenting is based on byte code instrumentation.

12. The method as in claim 1, wherein the software application is a Java application.

13. A method, comprising:
instrumenting, by a process, runtime of a software application in a secure environment;
detecting, by the process and as part of building a security policy based on a secure audit of the software application, reflection calls made within the runtime of the software application in the secure environment;
determining, by the process and from the reflection calls as part of building the security policy based on the secure audit, reflection targets and reflection callers of the reflection calls respectively;
generating, by the process, the security policy based on approving one or more of: the reflection calls, the reflection targets, and the reflection callers seen during the runtime of the software application in the secure environment; and
sharing, by the process, the security policy with local instrumentors of the software application to cause the local instrumentors to enforce the security policy against a local runtime of the software application.

14. The method as in claim 13, wherein the local instrumentors are caused to enforce the security policy for a local reflection call made during the local runtime of the software application by comparing a local reflection target, a local reflection caller, and thea local reflection call against the security policy, and by performing one or more mitigation actions on the local reflection call in response to a violation of the security policy.

15. The method as in claim 13, wherein the reflection targets comprise one or more of: a particular method for execution; a particular data field for access; a particular constructor; and a particular class discovery.

16. The method as in claim 13, wherein instrumenting is based on byte code instrumentation.

17. The method as in claim 13, wherein the software application is a Java application.

18. The method as in claim 13, wherein sharing the security policy with local instrumentors of the software application comprises:
pushing the security policy within the software application.

19. The method as in claim 13, wherein sharing the security policy with local instrumentors of the software application comprises:
pushing the security policy to local instrumentors locally instrumenting the software application.

20. A tangible, non-transitory, computer-readable medium having computer-executable instructions stored thereon that, when executed by a processor on a computer, cause the computer to perform a method comprising:
instrumenting runtime of a software application;
detecting a reflection call made within the runtime of the software application;
determining, from the reflection call, a reflection target and a reflection caller;
comparing the reflection target, the reflection caller, and the reflection call against a security policy, wherein the security policy is built based on a secure audit of the software application to determine reflection calls, reflection targets, and reflection callers; and
performing one or more mitigation actions on the reflection call in response to a violation of the security policy.

\* \* \* \* \*

UNITED STATES PATENT AND TRADEMARK OFFICE
CERTIFICATE OF CORRECTION

| | | |
|---|---|---|
| PATENT NO. | : 12,174,941 B2 | Page 1 of 1 |
| APPLICATION NO. | : 17/494952 | |
| DATED | : December 24, 2024 | |
| INVENTOR(S) | : Walter Theodore Hulick, Jr. | |

It is certified that error appears in the above-identified patent and that said Letters Patent is hereby corrected as shown below:

In the Specification

Column 14, Line 6 please amend as shown:
public Method[ ] getDeclaredMethods( )

Column 14, Line 12 please amend as shown:
public Method[ ] getMethods( )

Column 14, Line 62 please amend as shown:
org.apache.http.impl.conn.DefaultHttpResponseParser.(DefaultHttpResponsePars Column 14, Line 64 please amend as shown:
org.apache.http.impl.conn.DefaultHttpResponseParserFactory.create(DefaultHttpRes Column 14, Line 66 please amend as shown:
org.apache.http.impl.DefaultBHttpClientConnection.(DefaultBHttpClientConnection.

Column 15, Line 2 please amend as shown:
org.apache.http.impl.conn.LoggingManagedHttpClientConnection.(LoggingManaged Column 15, Line 33 please amend as shown:
com.singularity.ee.rest.controller.request.AControllerRequest.sendRequest(AController Column 15, Line 47 please amend as shown:
com.singularity.ee.util.javaspecific.scheduler.AgentScheduledExecutorServiceImpl$S Column 24, Line 9 please amend as shown:
reflection caller, and the local reflection call against the Signed and Sealed this
First Day of April, 2025

Coke Morgan Stewart
*Acting Director of the United States Patent and Trademark Office*